UNITED STATES PATENT OFFICE.

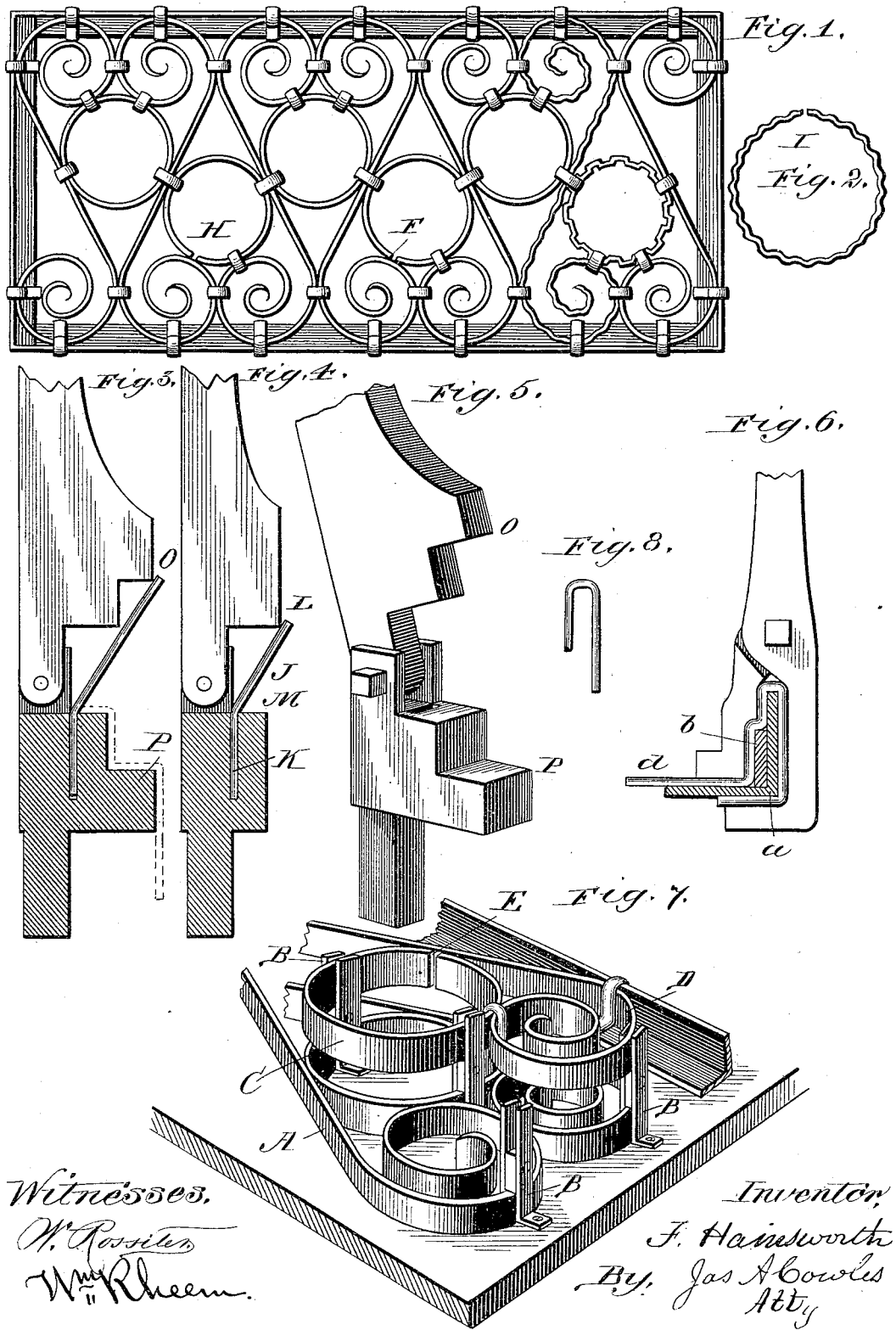

FREDERICK HAINSWORTH, OF CHICAGO, ILLINOIS.

MANUFACTURE OF SCROLL-WORK.

SPECIFICATION forming part of Letters Patent No. 351,436, dated October 26, 1886.

Application filed August 19, 1886. Serial No. 211,238. (No model.)

*To all whom it may concern:*

Be it known that I, FREDERICK HAINSWORTH, a citizen of the United States, residing in the city of Chicago, in the county of Cook and State of Illinois, have made certain new and useful Improvements in Scroll-Work, of which the following is the specification.

The nature and object of this invention are to provide a means of fastening and joining together the different parts forming and constituting scroll-work in a firm, compact, and inexpensive manner, without the use of nuts, bolts, or rivets, and without first having to weld, bolt, or rivet together the ends of the circular pieces used in forming the scroll-work.

This is an improvement on my application filed April 24, 1886, No. 200,009.

Figure 1 is a plan view of a section of scroll-work embracing my present improvements. Fig. 2 is a detail of circular piece or ring used, and made in corrugated form. Fig. 3 is a side view of the tool I use in forming the loops or bands used in fastening the scrolls to angle-iron sides or ends. Fig. 4 is a side view of tool used to form loop or band to unite or join the several parts of scroll-work together. Fig. 5 is a perspective of tool shown in Fig. 3. Fig. 6 is a side view of tool in the immediate act of having closed a loop or band around the side of angle-iron and scroll. Fig. 7 is a perspective of bed or frame used in fastening together the various pieces forming the scroll-work. Fig. 8 is a view of the loop used in fastening together the scrolls and bands or circular pieces.

I use any kind of suitable metal—such as iron or brass—made in light form and bent or formed into any kind or shape of scroll, or in circles or bands; and each piece can be made in corrugated form, as shown in Figs. 1 and 2.

The scroll-work is placed in position by using a table, upon which a pattern, A, of the particular work or piece of scroll-work to be made is placed. On this table and over the pattern are placed, at proper intervals, open-ended posts B. In these open-ended posts are placed the rings C and scroll D, leaving ample open space below each scroll and ring to allow the end of the loop to swing under. The ends of the ring or circular piece used are not welded or riveted together, but are brought to abut each other, as shown in Fig. 7 at E, and at F and H, Fig. 1, and at I, Fig. 2. The circular pieces are fastened to their neighboring piece by taking a loop, as shown in Fig. 8, and formed by the tool shown in Fig. 4, and placing it over the abutting ends of the circular piece and over the adjoining pieces, and by using a pair of angular-jawed tongues the longer arm of the loop is bent across the under side of the circular piece and its adjoining piece, thus causing the loop to snugly and firmly clasp the two abutting ends of the circular piece and the adjoining piece, thus holding or clasping them firmly together, as shown in Fig. 1.

The loop shown in Fig. 8 is formed by the tool shown in Fig. 4. It consists of a shouldered arm joined by means of a loose pin to another shouldered arm provided with a slot. The short strip of metal J is placed in the slot K, when the two arms are closed together, and the shoulder L of one arm forms the loop over the shoulder M of the other arm, causing the two arms of the loop to be placed nearly, if not quite, parallel with each other, with one arm longer than the other. (See Fig. 8.)

To form the loop used in fastening the circular or scroll pieces to the angle-iron pieces, a tool is used. (Shown in Figs. 3 and 5.) It differs from the one shown in Fig. 4 by each arm having an additional shoulder, O P, and when the arms are closed together one arm of the loop has an angle in it, as seen by the dotted lines in Fig. 3 and by the form shown in Fig. 6. This loop is shown in Fig. 6. *a* is the angle-iron, *b* is the scroll or circular piece, and *d* is the band or loop. The end *d* is turned over the edge of the angle-iron and meets the other end of the loop on the under side by the use of the hammer. The loop in all cases is brought to the requisite heat before it is placed in position.

In manufacturing scroll-work, bands or circular pieces are used with great advantage. They are used to fill up spaces with great economy, and at the same time they serve to strengthen the work. Abutting the ends together, as herein shown, and clasping the ends with the loop uniting the ends, and fastening the band to the adjoining piece, is accomplished by a single act.

Heretofore in making scroll-work formed of scrolls and bands the bands had to be formed complete by the ends being welded together or fastened together in some other way, and then fastened to their adjoining pieces by means of rivets or bolts and nuts, which was a difficult way to accomplish it, because of there not being room to directly strike the end of the rivet, while by the method herein shown the ends of the circular piece or band do not have to be welded together, nor do the parts have to be drilled preparatory to riveting.

I claim—

1. In scroll-work, the combination of a band or circular piece, with the ends thereof abutting together, with one or more adjoining pieces and a loop placed over the abutting ends, substantially in the manner and for the purpose shown.

2. That improvement in the art of forming scroll-work made of bands or circular pieces and scrolls which consists in joining or fastening the abutting ends of the bands or circular pieces with one or more adjoining pieces by clasping the same with a loop and bringing the open ends of the loop together by the use of a properly-formed tool, substantially as shown and described.

FREDERICK HAINSWORTH.

Witnesses:
ALONZO M. GRIFFEN,
JAS. A. COWLES.